July 9, 1963 R. P. GUTTERMAN 3,096,950

REEL IMPROVEMENT

Filed Oct. 24, 1960 2 Sheets-Sheet 1

INVENTOR

ROBERT P. GUTTERMAN

BY Cushman, Darby & Cushman

ATTORNEYS

INVENTOR
ROBERT P. GUTTERMAN

BY Cushman, Darby & Cushman
ATTORNEYS 3,096,950

REEL IMPROVEMENT

Robert P. Gutterman, Bethesda, Md., assignor to General Kinetics Incorporated, Arlington, Va., a corporation of Virginia Filed Oct. 24, 1960, Ser. No. 64,456
14 Claims. (Cl. 242—74)

This invention is directed to the art of reels for the winding, storage, and use of flexible strip materials, and is particularly directed to improvements in and to reels for use with magnetic recording or computing tapes and the like.

The present invention provides improved reels which possess great advantages in the ease of loading the tape on the reel and in preserving fidelity characteristics for the magnetic tape. This invention also provides an improved hub design for use with such reel.

Further, there is provided by this invention a new and improved process for loading flexible strip materials onto reels for the same.

It is, therefore, an object of this invention to provide an improved reel for winding, storing, and using flexible strip materials, especially magnetic tape or the like.

More specifically, it is an object of this invention to provide such a reel with a pair of solid flange plate members and a relatively incompressible hub member.

Another object of this invention is to provide an improved hub for tape reels comprising a substantially incompressible cylindrical element divided into major and minor chordal segments, and including a chordal slot therebetween for receiving and securing the end of the tape.

It is a further object of this invention to provide a reel with solid flange plate members having a relatively incompressible hub member formed of at least two chordal segments, slightly spaced from each other so as to provide a chordal slot therebetween to receive and secure the end of a tape.

Still a further object of this invention is to provide a reel having solid flange plate members wherein the above-described segmented incompressible hub member has at least one chordal segment spaced from one of said flange members to permit tape to be inserted through the resulting gap into the aforementioned chordal slot.

Still further objects of this invention are to provide reels of the aforementioned characteristic wherein a plurality of chordal segments are provided in the hub member, and wherein the hub member is provided with finger holes to assist insertion of the tape end in the reel.

A further object of this invention is to provide a novel and very simple process for loading flexible strip material onto a reel having a hub element which includes a chordal slot for receiving and securing the end of the strip.

Other objects of this invention will appear from the following description thereof.

Figure 1:
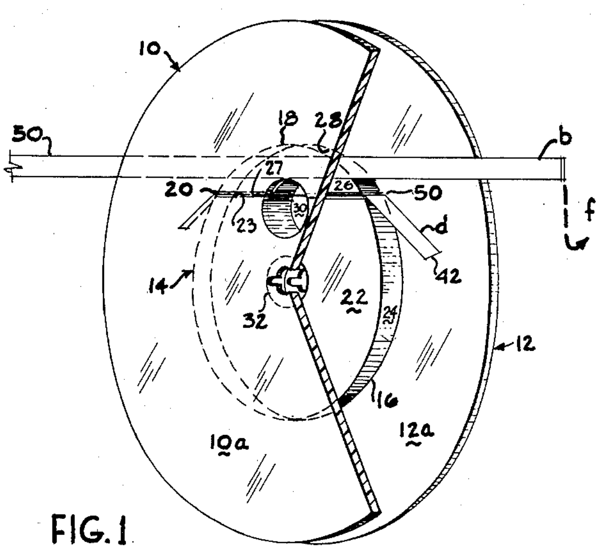
FIGURE 1 is a perspective view of a reel made in accordance with this invention.
Figure 2:
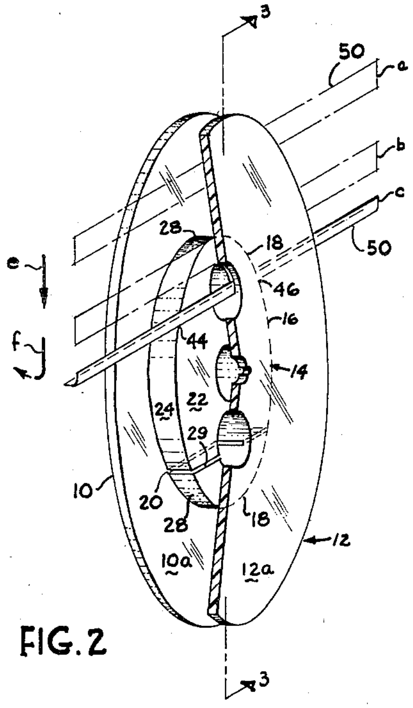
FIGURE 2 is another perspective view of a reel made in accordance with this invention and also illustrating the method of loading the tape onto the reel.

Referring to FIGURES 1 and 2, a reel according to this invention is shown having flange members 10 and 12, respectively, provided with solid plate elements 10*a* and 12*a*, shown in either side of a cylindrical hub member generally shown as 14. Hub member 14 is composed of the major chordal segment 16 and minor chordal segment 18, spaced from each other by a chordal slot 20. The major chordal segment 16 has sides (only one shown) 22, chordal edge 23, and peripheral cylindrical surface 24. The minor chordal segment portions 18 of the hub 14 are similarly provided with sides 26, chordal edge 27 and peripheral cylindrical surface 28. Preferably, the minor and major segmental portions of the hub member 14 are so made that when edges 23 and 27 are juxtaposed against each other, i.e., chordal slot 20 closed, surfaces 24 and 28 form a substantially continuous smooth cylindrical surface. Still more preferably, a truly smooth cylindrical surface is not formed by surfaces 24 and 28 unless edges 23 and 27 are separated from each other by a gap 29 (see FIG. 2) having dimensions substantially equal to the thickness of the magnetic tape or whatever other flexible strip material is to be wound on the reel. The hub member is formed entirely of a relatively incompressible material such as metal or hard plastic materials like polymethylmethacrylate.

Hub member and flange members 10 and 12 may be provided with finger hole 30, this hole communicating with chordal slot 20 as shown. The diameter of such finger holes should, of course, be appropriate to permit easy access for at least the average size forefinger. The finger hole, when provided, is simply to facilitate holding the tape end during loading of the reel, as will be discussed in greater detail hereinafter.

The axial center of the hub is also provided with one or more appropriately shaped openings 32 to permit keyed mounting of the reel on standard recording and computing equipment.

Figure 3:
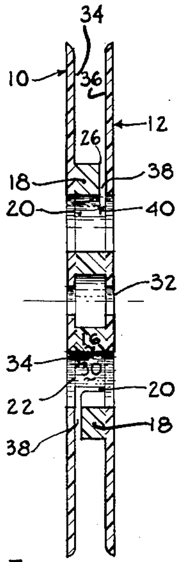
FIGURE 3 is a cross-section view of the reel of FIGURE 2 taken along the line 3—3.

Referring now to FIGURE 3, similar numbers correspond to the same elements described above with relationship to FIGURES 1 and 2. FIGURE 3 illustrates the manner in which the major and minor chordal segments of the hub member are disposed with relationship to the flange members.

As shown, the sides of the major chordal segment 16 are in full contact with the interior faces 34 and 36 of flange members 10 and 12; however, side 26 of minor chordal segment 18 is spaced from inner face 36 of flange member 12 so as to provide a passageway 38 therebetween. Passageway 38 communicates with chordal slot 20, as shown, with chordal segment 18 being preferably provided with a small arcuate portion 40 where these two passageways intersect each other. The function of curve 40 will be more fully described hereinafter. The two minor chordal segments 18 of the reel shown in FIGURE 3, are respectively affixed to the opposite flange members.

The method of loading the tape on the reel is best seen from FIGURES 1 and 2, keeping in mind the structural elements best illustrated in FIGURE 3. There is shown in FIGURES 1 and 2 a strip of magnetic tape 50 placed sequentially in positions *a*, *b*, *c*, and *d* as indicated by arrows *e* and *f*, the ends of the strip of the tape being manually held by the operator. Thus, the tape is first inserted between the flange plate members 10*a* and 12*a* in position *a*, and then brought downwardly in the direction of arrow *e* so as to slip into passageway 38, at position *b*. The tape is then brought further downwardly along the path of arrow *f* and axially bent around position *c*, and slipped into the chordal slot 20, position *d*. Curved or arcuate surface 40 on chordal segment 18 assists the insertion of the tape into slot 20 in this last step.

At this point, the operator may pull the end of the tape 43 into the chordal slot 20 so that it resides in the slot at some point between 44 and 46. The strip of tape will then extend out of only one end of the slot and may be wound about the hub by one or two hand revolutions of the reel. At this point, the tape is anchored in the reel and the reel is ready for winding. These operations may be facilitated by the use of finger hole 30, permitting the tape to be held in place before it is tightly imbedded, but the loading procedure is generally easy enough without this aid.

It will be seen from the above description that loading of the reels provided by the present invention is exceedingly easy. It is not necessary to insert a loose end of the very flexible material into the gap of the conventional "split hub." Furthermore, and quite importantly, finger access into the space between the flange plates 10*a* and 12*a* is unnecessary.

Referring to FIGURE 3, it will be appreciated that once the tape is cinched about the hub member 14, the centripetal compressive forces will close slots 20 between major and minor chordal segments 16 and 18, so that the tape end is gripped within slot 20, and also resulting in a substantially solid and incompressible hub member, by inducing a slight inward pivotal movement of plate members 10*a* and/or 12*a*. The space between innerfaces 34 and 36 of flange plate members 10*a* and 12*a* will also be reduced, but this movement is very slight due to the very small dimensions of slots 20 and passageway 38.

Referring now to FIGURES 4 through 10, there are illustrated therein further embodiments of this invention illustrating other ways by which the foregoing objectives may be achieved.

Figure 4:
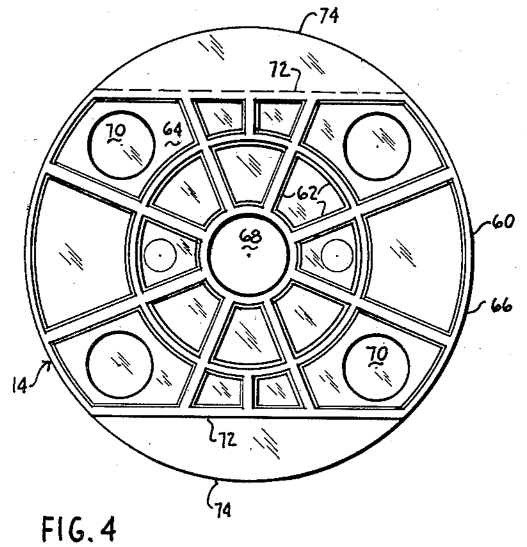
FIGURE 4 is a plan view of another embodiment of a hub member according to this invention.
Figures 5, 6, 7:
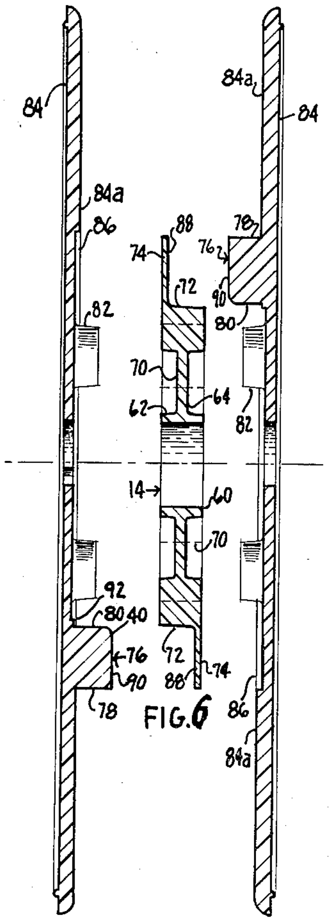
FIGURES 5, 6 and 7 show in cross-section the component parts of a reel according to this invention which employs the hub of FIGURE 4.

In the reel embodiments shown in FIGURES 4–8, the separately mounted hub and flange elements are provided with means for cooperatively maintaining their proper alignment with each other and the spacing of the chordal slot. The hub 14 of FIGURES 4 and 6 has a central core portion 60 comprising ribs 62, webs 64 and rim 66. Integral with rim 66 are chordal edge ribs 72. Coplanar with opposed sides of the hub core 60 are skirt segments 74, having a terminal arcuate edge substantially contiguous with the adjacent rim 66. The ribs 62 reinforcing the web 64, coupled with the structural features provided by rim 66 and edge 72 all contribute to afford a rigid hub element having, for purposes of the present invention, characteristics substantially equivalent to a solid core. Indeed, the principal advantage of the specific reinforced rib section of the hub of FIGURES 4 and 6 is a saving in plastic. It will be observed, of course, that this hub 14 is provided with a central opening 68 adapted to receive the appropriate spindle or mounting axle of the recording or play-back equipment. It will be appreciated, of course, that the skirt segments may be on the same side of the hub in another embodiment of the invention.

Figure 8:
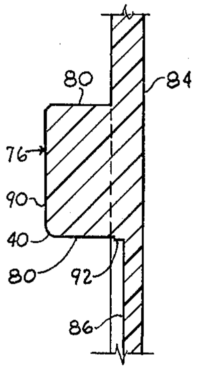
FIGURE 8 is a detail in cross-section of the flange in FIGURE 7.

The flange members 84 of FIGURES 5 and 7 are provided with recessed shelf areas 86, conforming to the plane configuration of the skirt segment 74, and adapted for receiving the same so that the inner side 88 of the skirt segment will, in the assembled reel, be substantially coplanar with the inner surface 84*a* of the flange member, within which it is recessed on shelf 86. Each flange member 84 is also suitably provided with bosses 82 adapted for insertion in aligning wells 70 of the hub core 60, and cooperating therewith to maintain the respective flange members and hub member in proper register with each other. Suitable press fit construction may be provided to secure the assembled construction of the three components through these bosses 82, or, alternatively, some other suitable fastening means may be employed such as machine screws or bolts, in which event, bosses 82 are preferably suitably threaded to receive the same. FIGURES 5, 7 and 8 also show that each flange member is provided with a minor chordal segment 76 having a hub rim surface 78, and a chordal edge 80. These minor chordal segments are preferably provided with a small radius 40 at the intersection of chordal edge 80 and side 90 thereof. Chordal edge 80 of each minor chordal segment 76 will be substantially coterminous with the adjacent chordal edge 72 of the hub core 60, and respective pairs of these adjacent sides define the chordal slots characterizing this reel invention. It will also be observed that the flange members in this reel construction are identical. Thus, only one mold therefor is required. When the skirt segments of the hub are coplanar, one "smooth" flange would be required with both minor chordal segments on the other.

As best seen from FIGURE 8, the flange members 84 are further provided with a shoulder portion 92 at the juncture of chordal edge 80 of the minor chordal segment 76, and the inner surface 86*a* of the recessed adjacent shelf portion 86. This shoulder member 92 butts against chordal edge 72 of hub core 60 in the assembled reel and conveniently provides accurate control for the spacing between edges 72 and 80. It will be appreciated in this connection, that as the reel is preferably fabricated from plastic materials, maintaining high tolerances in the mounting operations is not entirely feasible; but, a most satisfactorily accurate spacing for the chordal slot is achievable through the provision of shoulder portion 92.

It will also be understood that the reel of the embodiment illustrated in FIGURES 4–8 will be loaded in the same fashion as the reel of FIGURES 1–3. That is, the tape will be inserted through the passageway existing between surfaces 88 and 90 twisted about radius 40, and finally inserted in the chordal slot between edges 72 and 80. In the assembled reel, surfaces 88 and 90 may butt directly against each other, since the flange plate element may be flexed slightly to permit insertion of the tape between the flange and the hub segment, as may also be done in the reel of FIGURES 1–3; or the minor chordal segments 76 may be made slightly thinner than the comparative dimension of the hub member 14 so that a small gap always exists between surfaces 88 and 90. As the above discussion of FIGURE 1 indicates, this invention also contemplates a reel of the form of FIGURES 4–7 but with only one chordal slot.

Figure 9:
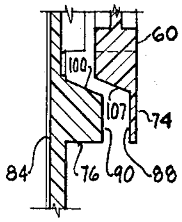
FIGURES 9 and 10 show in cross-section variations in the structure of the detail of FIGURE 8.
Figure 10:
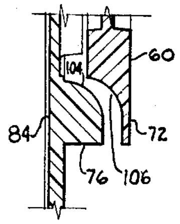

While not preferred as the invention is presently practiced, further alternative embodiments within the scope thereof are illustrated in FIGURES 9 and 10. Here there are shown portions of flange and hub members such as illustrated in FIGURES 5–7 in position for assembling, the similar numbers designating similar elements. Thus, flange member 84 is provided with minor chordal segment 76 having a recessed shelf portion 86 adapted to be assembled with hub core member 60 and its skirt segment 74. In this instance, however, minor chordal edge 100 on the minor chordal segment 76 and the corresponding chordal edge 102 on the hub core member 60 are angularly disposed with respect to the plane of the reel (it being noted that the previous reels generally showed the chordal slot perpendicular to the plane of the reel). Such angular disposition of the chordal slot is entirely operable, although a twisting of the tape will necessarily occur as it exits from the slot and is wound about the hub rim.

Similarly, in FIGURE 10 the respectively corresponding chordal edges 104 and 106 are arcuate in form. This construction facilitates the loading operation, per se, being essentially an exaggeration of the radius 40, and is an operative embodiment. However, for the reason already expressed with reference to the embodiment of FIGURE 9, the construction shown in FIGURE 10 is not presently preferred.

It will be seen from the foregoing description of the drawings that the improved reels provided by this invention are especially distinguished by three characteristics: the solid plate elements, the effectively solid substantially incompressible hub member, and particularly the means and method for loading the tape.

The first two of these, in combination, lead to a reel of remarkably improved characteristics in respect to its effect on the properties of the tape material wound thereon. Dimensional distortion of plastic tape material, such as conventional magnetic tapes, can occur due to "solid flow" of the plastic if it becomes set in a twisted, stretched, irregular, or skewed position, and this may result in serious distortion of the signal on the tape. Use of the reel provided by the present invention substantially overcomes distortion damage to the tape wound thereon which results from use of the prior, conventional, "split hub" or compressible hub reels, and reels having flanges with holes or openings. Full radial support is provided to the tape pile by the incompressible hub, permitting a continuous smooth spiral winding of the tape pile, free from distorting depressions, eliminating so-called "hub-end" damage. At the same time, the solid flanges eliminate the previously experienced "plate hole" damage to the edges of the tape. Moreover, winding of the tape on the reels with the present invention generally yields a more stable tape pile without distortion liability from "packed air" layers between tape layers (built up during winding with apertured flange reels), and other dimensional distorting effects, such as oscillatory skew effects. Irregular distortion effects developed within the tape pile due to changes in surrounding atmosphere conditions are also avoided.

Present day commercial reels for one-quarter inch tape typically have a nominal flange spacing of about five-sixteenths of an inch, permitting loose tape to lie on the reel in a skewed fashion such that the tape can take sideways set, as mentioned above, equal to one-sixteenth inch in a circumference of twenty-two inches. This set can become substantially permanent as a result of plastic flow. Reels according to the present invention can be made so that the flange separation varies only between about 0.2525 inch and about 0.2590 inch. Taking the minimum tape width to be 0.2460 inch, this affords a clearance of only between 0.013 inch and 0.0065 inch. Other dimensions of the reels can, of course, conform to the standard now used by the industry, both as to hub diameter, flange diameter, and the resulting tape capacity of the reel.

One of the remarkable characteristics of the reel of the present invention is that it can actually be used to improve tapes which have become damaged and almost unusable for storage work by winding or storage on conventional reels. If such a tape is wound on a reel of the present invention and subjected to a standard temperature cycle, the quality of the tape is actually improved over significant portions of its length, due to the enforced straightening and "ironing out" imposed by the restricted storage space.

As will be appreciated from the foregoing discussion, the reels provided by the present invention may generally be made of the conventional materials employed in the manufacture of present day reels. Preferably, the materials comprise plastics such as nylon, polyalkylene terephthalates, polyalkyl acrylates (especially polymethyl methacrylates), and some forms of polyethylene and polypropylene (those specifically treated to produce the requisite hardness, as in irradiated polyethylene). The polymers of alkyl chloracrylates may also be used. These plastic materials need not contain plasticizers, and this is a preferred aspect of the choice of materials. In addition, the reel may be made of metal, especially such metals as aluminum and aluminum alloys, magnesium and magnesium alloys, and like light metals and alloys thereof having analogous properties. All of these materials possess the requisite substantially incompressible physical property while also exhibiting the desired inherent slight flexibility which allows the aforementioned slight pivotal movement of the flanges to permit the chordal slots to close under the winding tension to firmly secure the tape end therein and provide the effectively solid required hub structure inside the wound tape pile. Of course, this invention contemplates reels wherein the hub and the flange members are made of different materials. The choice of construction materials is one clearly within the skill of present day reel manufacturers, and can be suitably made in the light of the foregoing discussion.

The means for assembling the various component parts of the reel will obviously vary to some extent depending upon the construction materials employed. Particularly, when the reel is molded from a plastic material such as polystyrene, it is advantageous to make the reel as illustrated in FIGURE 3. As shown in this drawing, each flange is integrally molded with a minor chordal segment, and the major chordal segment of the hub is separately molded. The flanges may then be secured to the major chordal segments, and the reel thereby completely assembled, by any suitable means including machine screws, rivets, press-fit pins, etc., not shown, It is also possible simply to employ suitable adhesives or cements to assemble the reel.

Alternatively, of course, the flanges and each of the chordal segments of the hub structure may be separately molded and then secured to each other in appropriate relationship to assemble the reel, by any of the conventional means, for instance, those already mentioned. It is also within the scope of this invention to fabricate the component parts of the reel wherein the major chordal segment is integral with one of the flanges, the other flange is molded either separately or integrally with one of the minor chordal segments, and, if a second chordal segment is employed, this is either also separately made or integral with the major-chordal-segment-bearing flange, and then mounted in the appropriate relationship on the first-mentioned flange member carrying the major chordal segment. The reel shown in FIGURE 1 may be made, for instance, with the minor chordal segment 18 integrally molded with flange 12 and the major chordal segment 22 integrally molded with flange 10.

In the light of the foregoing discussion, it is obvious that the term "relatively incompressible" in this description and in the appended claims is used with reference to the physical properties characteristically exhibited by the subject reel hubs when fabricated from the construction materials mentioned, i.e., the radial forces opposing the centripetal compressive forces exerted by the tape pile. These forces are intended to be substantially equal to those which would exist if the hub were fully solid. Because of the inherent strength of the materials employed, there may actually be significant internal voids in the hub—but not, of course, communicating with the cylindrical surface thereof, as illustrated in FIGURE 4.

It is therefore, apparent that the present invention as described hereinabove may be embodied in the specific reels and processes illustrated, but that the full scope of the invention is limited only by the spirit of the terms of the following claims.

I claim:

1. A cylindrical hub for use in a reel having a flange with an inner surface for winding and storage of flexible strip material, said hub comprising at least two chordal segments, the width of one of said segments being less than the width of the other of said segments, each of said segments having a chordal edge, said segments being adapted for planar mounting with said chordal edges adjacent each other, and forming therebetween a chordal slot arranged for direct communication with said inner surface of the flange.

2. The hub member of claim 1, wherein there are two minor chordal segments, adapted for planar mounting with a major chordal segment.

3. The hub of claim 1, wherein said segments are formed of metal.

4. The hub of claim 1, wherein said segments are formed of a hard substantially incompressible plastic material.

5. The hub of claim 1, wherein a major chordal segment has a finger-sized opening extending therethrough and in communication with said chordal side.

6. The hub of claim 5, wherein said opening also partially extends into the minor chordal segment.

7. A hub for use in the tape reels which comprises a core element defined by a pair of spaced opposed parallel sides, a pair of substantially opposed arcuate rim edges, and a pair of substantially opposed chordal edges terminating at the said rim edges, and a skirt segment depending from each chordal edge and coplanar with a side of said core element, said skirt segments having an arcuate outer edge with the radius the same as said arcuate rim edges.

8. The hub of claim 7 wherein said skirt segments are coplanar with opposed sides of said core element.

9. A hub for use in tape reels which comprises a core element comprised of a web reinforced with a plurality of ribs, said core element having a pair of spaced opposed parallel sides, a pair of substantially opposed arcuate rim edges, and a pair of substantially opposed chordal edges terminating at the said rim edges, said sides and edges all having a thickness substantially greater than said web thickness and substantially the same as the thickness of the ribs, and a skirt segment depending from each of said chordal edges and coplanar with one side of said core element, said skirt segments having a radius the same as the radius of said arcuate rim edges.

10. In reels for flexible strip materials having a hub and flanges respectively coupled on the opposed sides of said hub and in axial alignment therewith, each of said flanges having an inner surface, the improved hub which comprises a major chordal segment and a minor chordal segment, the width of said minor chordal segment being slightly less than the width of the said major chordal segment, each of said segments having a side defining a chordal plane, said segments being adapted for planar mounting with said chordal sides adjacent each other and forming therebetween a chordal slot in open communication with one of said inner surfaces of the said flanges.

11. A reel for storage and use with magnetic tapes and like materials which comprises a pair of substantially planar solid flanges, each flange having an inner surface, a substantially incompressible cylindrical hub element axially mounted between said flanges, said hub element having a chordal slot lying between said inner surfaces of said flanges and dividing said hub element into a major chordal segment and a minor chordal segment, said minor chordal segment being spaceable from one of said inner surfaces by flexing the flange, said chordal slot being in open communication at its ends with the cylindrical surface of said hub element, and in direct open communication along one side thereof with the inner surface of said flange spaceable from said minor chordal segment, said flanges extending in solid section radially beyond the cylindrical surface of said hub member.

12. A reel for storage and use with magnetic tapes and like materials which comprises a pair of substantially planar solid flanges having generally parallel outer and inner surfaces, and a substantially incompressible cylindrical hub element axially mounted between said flanges, said hub element having a pair of chordal slots lying between said inner surfaces of said flanges, and dividing said hub element into a major chordal segment and two minor chordal segments, the first of said minor chordal segments being spaceable from one of said inner surfaces by flexing a first one of said flanges and the second of said minor chordal segments being spaceable from the other one of said inner surfaces by flexing the other of said flanges, each of said chordal slots being in open communication at its ends with the cylindrical surface of said hub element, the first of said chordal slots being in direct open communication along one side thereof with the inner surface of said first flange and the second of said chordal slots being in direct open communication along one side thereof with the inner surface of said other of said flanges, said flanges including plate elements extending radially in solid section beyond the cylindrical surface of said hub element.

13. A reel for storage of and use with flexible strip material which comprises a pair of generally circular flange elements having parallel outer and inner generally planar surfaces, a generally circular recessed shelf on each inner surface, generally co-axial with said flange but of lesser radius, a chordal segment member mounted on said shelf and having an arcuate rim of substantially common radius with the radius of said shelf, and a chordal edge, the chordal edge of said chordal segment being coextensive with a chord of said shelf, a small up-raised chordal shoulder at the juncture of the surface of said shelf and said chordal segment, and a hub element comprising a hub core segment having a pair of generally parallel substantially planar sides, an arcuate rim of substantially common radius with the radius of said shelf and a hub chordal edge of dimensions complementary to the dimensions of said chordal edge on said chordal segment, a skirt element depending from and substantially coplanar with one of said sides on said core segment, said skirt element having a plan configuration substantially complementary with the plan configuration of the said chordal segment members, the combined width of the chordal segment and the skirt element being substantially equal to the width of the hub core, and means for rigidly mounting said hub element between said flange elements co-axial therewith, with said skirt element disposed in said shelf on one of said flanges and with said hub chordal edge opposing said chordal segment edge and spaced therefrom by said chordal shoulder.

14. A process for loading a tape material on a reel having a pair of flanges and a cylindrical hub member axially mounted between said flanges, wherein said hub member is composed of minor and major chordal segments spaced from each other by a chordal slot, said flanges have generally parallel outer and inner generally planar surfaces, and said minor chordal segment is spaceable from the inner surface of one of said flanges to form a gap between said minor chordal segment and said flange, said chordal slot communicating with the said gap and with the cylindrical surface of said hub, which process comprises passing said tape between said flange members while maintaining the plane of said tape substantially parallel to the plane of the inner surface of said flange members, spacing said minor chordal segment from one of said inner surfaces, inserting said tape into the resulting space between said minor chordal segment and the inner flange surface, bending the tape along its longitudinal length and sliding the same into said chordal slot, and thereafter turning said reel to wind at least one complete circumferential layer of said tape around said hub member whereby said tape is securely cinched and secured in position in said chordal slot.

References Cited in the file of this patent

UNITED STATES PATENTS

| | | |
|---|---|---|
| 856,254 | Helmond | June 11, 1907 |
| 2,467,607 | Bates | Apr. 19, 1949 |
| 2,983,462 | Berlings | May 9, 1961 |

FOREIGN PATENTS

| | | |
|---|---|---|
| 985,947 | France | Mar. 21, 1951 |
| 1,102,943 | France | May 18, 1955 |
| 1,164,842 | France | May 19, 1958 |
| 1,191,627 | France | Apr. 13, 1959 |
| 728,251 | Germany | Nov. 23, 1942 |